United States Patent
Moharrer et al.

(10) Patent No.: US 11,868,854 B2
(45) Date of Patent: Jan. 9, 2024

(54) USING METAMODELING FOR FAST AND ACCURATE HYPERPARAMETER OPTIMIZATION OF MACHINE LEARNING AND DEEP LEARNING MODELS

(71) Applicant: Oracle International Corporation, Redwood Shores, CA (US)

(72) Inventors: Ali Moharrer, San Jose, CA (US); Venkatanathan Varadarajan, Seattle, WA (US); Sam Idicula, Santa Clara, CA (US); Sandeep Agrawal, San Jose, CA (US); Nipun Agarwal, Saratoga, CA (US)

(73) Assignee: Oracle International Corporation, Redwood Shores, CA (US)

(*) Notice: Subject to any disclaimer, the term of this patent is extended or adjusted under 35 U.S.C. 154(b) by 1120 days.

(21) Appl. No.: 16/426,530

(22) Filed: May 30, 2019

(65) Prior Publication Data

US 2020/0380378 A1     Dec. 3, 2020

(51) Int. Cl.
*G06N 20/00* (2019.01)
*G06N 5/022* (2023.01)
(Continued)

(52) U.S. Cl.
CPC ............. *G06N 20/00* (2019.01); *G06N 5/022* (2013.01); *G06N 20/20* (2019.01); *G06N 5/01* (2023.01)

(58) Field of Classification Search
CPC ........ G06N 20/00; G06N 20/20; G06N 5/022; G06N 5/003
See application file for complete search history.

(56) References Cited

U.S. PATENT DOCUMENTS 6,842,751 B1   1/2005   Vilalta et al.
10,832,087 B1  11/2020  Wang et al.
(Continued)

FOREIGN PATENT DOCUMENTS

EP   2 128 798 A1      12/2009
EP   3 101 599 A2      12/2016
WO   WO 2008/133509 A1  11/2008

OTHER PUBLICATIONS

Wistuba et al., "Learning Hyperparameter Optimization Initializations", 2015, 2015 IEEE International Conference on Data Science and Advanced Analytics (DSAA), pp. 1-10 (Year: 2015).*

(Continued)

*Primary Examiner* — Marc S Somers
*Assistant Examiner* — Asher H. Jablon
(74) *Attorney, Agent, or Firm* — Hickman Becker Bingham Ledesma LLP; Brian N. Miller

(57) ABSTRACT

Herein are techniques that train regressor(s) to predict how effective would a machine learning model (MLM) be if trained with new hyperparameters and/or dataset. In an embodiment, for each training dataset, a computer derives, from the dataset, values for dataset metafeatures. The computer performs, for each hyperparameters configuration (HC) of a MLM, including landmark HCs: configuring the MLM based on the HC, training the MLM based on the dataset, and obtaining an empirical quality score that indicates how effective was said training the MLM when configured with the HC. A performance tuple is generated that contains: the HC, the values for the dataset metafeatures, the empirical quality score and, for each landmark configuration, the empirical quality score of the landmark configuration and/or the landmark configuration itself. Based on the performance tuples, a regressor is trained to predict an (Continued)

estimated quality score based on a given dataset and a given HC.

17 Claims, 6 Drawing Sheets

(51) Int. Cl.
    *G06N 5/01*           (2023.01)
    *G06N 20/20*        (2019.01)

(56) References Cited

U.S. PATENT DOCUMENTS

| | | | |
|---|---|---|---|
| 11,392,859 B2* | 7/2022 | Basu | G06N 7/005 |
| 2002/0169735 A1 | 11/2002 | Kil et al. | |
| 2011/0022907 A1* | 1/2011 | Jiang | G01R 31/318519 |
| | | | 714/E11.155 |
| 2014/0188768 A1 | 7/2014 | Bonissone et al. | |
| 2014/0344193 A1 | 11/2014 | Bilenko et al. | |
| 2017/0061329 A1 | 3/2017 | Kobayashi et al. | |
| 2018/0022539 A1 | 1/2018 | Vedani | |
| 2018/0336453 A1* | 11/2018 | Merity | G06N 3/082 |
| 2019/0043193 A1* | 2/2019 | Odaibo | G06K 9/6227 |
| 2019/0087529 A1 | 3/2019 | Steingrimsson | |
| 2019/0095756 A1 | 3/2019 | Agrawal | |
| 2019/0095785 A1 | 3/2019 | Sarkar et al. | |
| 2019/0095818 A1 | 3/2019 | Varadarajan | |
| 2019/0147336 A1* | 5/2019 | Yu | G06F 18/214 |
| | | | 706/15 |
| 2019/0197357 A1 | 6/2019 | Anderson | |
| 2019/0220748 A1* | 7/2019 | Denil | G06N 3/0445 |
| 2019/0244139 A1 | 8/2019 | Varadarajan | |
| 2019/0392255 A1 | 12/2019 | Franklin | |
| 2020/0034197 A1 | 1/2020 | Nagpal et al. | |
| 2020/0082013 A1 | 3/2020 | Triplet et al. | |
| 2020/0242400 A1 | 7/2020 | Perkins | |
| 2020/0327357 A1 | 10/2020 | Karnagel | |
| 2020/0327448 A1 | 10/2020 | Yakovlev | |
| 2020/0364599 A1 | 11/2020 | Ma | |
| 2021/0390466 A1 | 12/2021 | Varadarajan et al. | |

OTHER PUBLICATIONS

Maher et al., "SmartML: A Meta Learning-Based Framework for Automated Selection and Hyperparameter Tuning for Machine Learning Algorithms", Mar. 2019, In EDBT: 22nd International Conference on Extending Database Technology, pp. 554-557 (Year: 2019).*
Varadarajan, U.S. Appl. No. 15/914,883, filed Mar. 7, 2018, Final Office Action, dated Mar. 2, 2021.
Brazdil et al., "Ranking Learning Algorithms: Using IBL and Meta-Learning on Accuracy and Time Results", dated 2003 Kluwer Academic Publishers. Manufactured in The Netherlands, 27 pages.
Feurer et al., "Initializing Bayesian Hyperparameter Optimization via Meta-Learning", Proceedings of the Twenty-Ninth AAAI Conference on Artificial Intelligence dated 2015, 8 pages.
Feurer et al., "Efficient and Robust Automated Machine Learning", dated 2015, 9 pages.
Doan et al., "Selecting Machine Learning Algorithms using Regression Models", https://www.researchgate.net/publication/304298580, dated Nov. 2015, 8 pages.
Doan et al., "Algorithm Selection Using Performance and Run Time Behavior", Chapter, Artificial Intelligence: Methodology, Systems and Applicationsm AISMSA dated Sep. 2016, pp. 3-13.
Chen Chi-Ou et al., "Machine Learning-Based Configuration Parameter Tuning on Hadoop System", dated Jun. 27, 2015, IEEE, pp. 386-392.
Castiello et al., "Meta-data: Characterization of Input Features for Meta-learning", Springer-Verlag Berlin Heidelberg dated 2005, 13 pages.
Aldave et al., "Systematic Ensemble Learning fro Regression" dated Mar. 28, 2014, pp. 1-38.
Brazdil, Pavel, "Metalearning and Algorithm Selection: Progress, State of the Art and Introduction of the 2018 Special Issue", dated Dec. 2017, 23 pages.
Gonnet et al., Automatic Problem-Specific Hyperparameter Optimization and Model Selection for Supervised Machine Learning, Technical Report, dated Jan. 1, 2015, 54 pages.
Bergstra et al., "Random Search for Hyper-Parameter Optimization", Journal of Machine Learning Research dated Feb. 13, 2012 281-305, 25 pages.
Bergstra et al., "Making a Science of Model Search: Hyperparameter Optimization in Hundreds of Dimensions for Vision Architectures", Conference on Machine Learning, dated 2013, vol. 28, 9 pages.
Bergstra et al., "Hyperparameter Optimization and Boosting for Classifying Facial Expressions: How good can a "Null" Model be?", ICML Workshop on Representation and Learning, dated 2013, 7 pages.
Bergstra et al., "Hyperopt: A Python Library for Optimizing the Hyperparameters of Machine Learning Algorithms", Proc. of The 12th Python in Science Conf. (SCIPY 2013), dated 2013, 8 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Andrychowicz et al., "Learning to learn by gradient descent by gradient descent", 30th Conference on Neural Information Processing Systems dated (NIPS 2016), Barcelona, Spain, 9 pages.
Caruana et al., "Ensemble Selection From Libraries of Models", Proceedings, Twenty-First International Conference on Machine Learning: dated Jul. 2004, 8 pages.
Maclaurin et al., "Gradient-based Hyperparameter Optimization through Reversible Learning", Proceedings of the 32nd International Conference on Machine Learning, Lille, France, dated 2015, 10 pages.
Snoek et al., "Practical Bayesian Optimization of Machine Learning Algorithms", dated 2012, 9 pages.
Simpson et al, "Automatic Algorithm Selection in Computational Software Using Machine Learning", dated 2016, 10 pages.
Scikit Learn, "3.2 Tuning the hyper-parameters of an estimator", http://scikit-learn.org/stable/modules/grid_search.html, last viewed on Mar. 13, 2018, 5 pages.
Reif et al., "Prediction of Classifier Training Time including Parameter Optimization", dated Oct. 2011, 13 pages.
Pinter, Janos, "Calibrating Artificial Neural Networks by Global Optimization", Technical Report, Özyeğin University, Istanbul Submitted for publication: Jul. 2010, 17 pages.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Peˇskov'a et al., "Hybrid Multi-Agent System for Metalearning in Data Mining", dated Sep. 19, 2014, 2 pages.
Filchenkjov et al., "Datasets Meta-Feature Description for Recommending Feature Selection Algorithm", dated Nov. 2015, 9 pages.
Mendes-Moreira et al., "Ensemble Approaches for Regression", ACM Computing Surveys, ACM, New York, NY vol. 45, No. 1, dated Dec. 7, 2012, pp. 1-40.
Furnkranz et al., "An Evaluation of Landmarking Variants", dated 2001, 12 pages.
Lindne et al., "AST: Support for Algorithm Selection with a CBRApproach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Kuck et al, "Meta-learning with neural networks and landmarking for forecasting model selection an empirical evaluation of different feature sets applied to industry data", dated Jul. 24-29, 2016, 8pgs.

(56) References Cited

OTHER PUBLICATIONS

J.D Wichard, "Model Selection in an Ensemble Framework", The 2013 International Joint Conference on Neural Networks, dated Jan. 1, 2006, pp. 2187-2192.

Gonzalez et al., "Batch Bayesian Optimization via Local Penalization", Proceedings of the 19th International Conference on Artificial Intelligence and Stats JMLR: W&CP vol. 41, dated 2016, 10 pages.

Weinberger et al., "Unsupervised learning of image manifolds by semidefinite programming", IEEE, dated Jun. 27, 2004, 10 pages.

Nelder et al., "A Simplex Method for Function Minimization", The Computer Journal, vol. 7, dated Apr. 1, 1964, pp. 308-313.

Yakovlev, U.S. Appl. No. 16/384,588, filed Apr. 15, 2019, Non-Final Rejection, dated Sep. 16, 2021.

Yakovlev, U.S. Appl. No. 16/384,588, filed Apr. 15, 2019, Final Rejection, dated Jan. 18, 2022.

Varadarajan, U.S. Appl. No. 15/914,883, filed Mar. 7, 2018, Non-Final Rejection, dated Jan. 20, 2022.

Varadarajan, U.S. Appl. No. 15/914,883, filed Mar. 7, 2018, Non-Final Rejection, dated Aug. 17, 2021.

Varadarajan, U.S. Appl. No. 15/914,883, filed Mar. 7, 2018, Final Rejection, dated Oct. 22, 2021.

Varadarajan, U.S. Appl. No. 15/914,883, filed Mar. 7, 2018, Advisory Action, dated Dec. 13, 2021.

Varadarajan, U.S. Appl. No. 15/914,883, filed Mar. 7, 2018, Advisory Action, dated Jun. 28, 2021.

Varadarajan, U.S. Appl. No. 15/885,515, filed Jan. 31, 2018, Office Action, dated Jun. 17, 2021.

Varadarajan, U.S. Appl. No. 15/885,515, filed Jan. 31, 2018, Notice of Allowance, dated Aug. 4, 2021.

Varadarajan, U.S. Appl. No. 15/885,515, filed Jan. 31, 2018, Notice of Allowance, dated Jul. 26, 2021.

Varadarajan, U.S. Appl. No. 15/914,883, filed Mar. 7, 2018, Office Action, dated Dec. 1, 2020.

Yogatama et al., "E cient Transfer Learning Method for Automatic Hyperparameter Tuning", Proceedings of the 17th International Conference on Artifical Intelligence and Statistics dated 2014, 9 pages.

Swersky et al., "Multi-Task Bayesian Optimization", dated 2013, 9 pages.

Kim et al., "Learning to Transfer Initializations for Bayesian Hyperparameter Optimization", 31st Conference on Neural Information Processing Systems dated 2017, Long Beach, CA, USA, 5 pages.

Feurer et al., "Using Meta-Learning to Initialize Bayesian Optimization of Hyperparameters", dated 2014, 8 pages.

Feurer et al., "Initializing Bayesian Hyperparameter Optimization via Meta-Learning", dated 2015, 8 pages.

Bardenet et al., "Collaborative hyperparameter tuning", Proceedings of the 30 th International Conference on Machine Learning, Atlanta, Georgia, USA, 2013, 9 pages.

Hadi S. Jomaa et al., "Dataset2Vec: Learning Dataset Meta-Features," May 27, 2019, 13 pages.

Singh et al., "Literature Review on Feature Selection Methods for High-Dimensional Data", International Journal of Computer Applications, vol. 136, No. 1, dated Feb. 2016, 9 pages.

Parmezan et al., "Metalearning for Choosing Feature Selection Algorithms in Data Mining: Proposal of a New Framework", Preprint submitted to Expert Systems with Applications, Nov. 4, 2016, 66 pgs.

Microsoft Docs, "Feature Selection in the Team Data Science Process", dated Nov. 20, 2017, 5 pages.

Li et al., "Feature Selection: A Data Perspective", AMC, Computer Suru 9, Article 39, dated Mar. 2010, 45 pages.

Krupka et al., "Learning to Select Features using their Properties", Journal of Machine Learning Research 9, dated 2008, 28 pages.

Zhu et al., "To prune, or not to prune: exploring the efficacy of pruning for model compression", dated 2017, 11 pages.

Thornton et al., "Auto-WEKA: Combined Selection and Hyperparameter Optimization of Classification Algorithms", New York, New York, dated Mar. 6, 2013, 9 pages.

Stamoulis et al., "HyperPower: Power- and Memory-Constrained Hyper-Parameter Optimization for Neural Networks", dated 2018, 7 pages.

Sprechmann et al., "Memory-Based Parameter Adaptation", Published as a conference paper at ICLR dated 2018, 16 pages.

Shohoni et al., "Low-Memory Neural Network Training: A Technical Report", Stanford University, dated Apr. 25, 2019, 38 pages.

Li et al., "Hyperband: A Novel Bandit-Based Approach to Hyperparameter Optimization", Journal of Machine Learning Research 18 (dated 2018) pp. 1-52.

Jomaa et al., "Dataset2Vec: Learning Dataset Meta-Features", dated May 5, 2019, 20 pages.

Hutter et al., "Sequential Model-Based Optimization for General Algorithm Configuration", Conference on the Theory and Applications of Cryptographic Techniques, dated Jan. 17, 2011. 17 pages.

Han et al., "Deep Compression: Compressing Deep Neural Networks With Pruning, Trained Quantization and Huffman Coding", Conference Paper at ICLR dated 2016, 14 pages.

Gelbart et al., "Bayesian Optimization with Unknown Constraints", dated 2014, 10 pages.

The International Searching Authority, "Search Report" in Application No. PCT/US2021/044093, dated Dec. 23, 2021, 13 pages.

Matthias Reif, et al., "Dataset Generation for Meta-Learning," 2012, pp. 69-73.

M. Faith Amasyalie et al., "A Study for Meta Learning for Regression," Jul. 1, 2009, 26 pages.

Current Claims in Application No. PCT/US2021/044093, dated Dec. 2021, 4 pages.

Christophe Giraud-Carrier, "New Insights into Learning Algorithms and Datasets," Jan. 2008, 7 pages.

Ridd et al., "Using Metalearning to Predict When Parameter Optimization is Likely to Improve Classification Accuracy", MLAS '14, 2014, 6 pages.

Molina et al., "Meta-Learning Approach for Automatic Parameter Tuning: A Case Study with Educational Datasets", Proceedings of the 5th International Conference on Educational Data Mining, 2012, 4 pages.

USPTO, "Public Views on Artificial Intelligence and Intellectual Property Policy", dated Oct. 2020, 50 pages.

Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.

Olson et al., "Evaluation of a Tree-based Pipeline Optimization Tool for Automating Data Science", dated Mar. 20, 2016, 8 pages.

Kraska, Tim, "Northstar: An Interactive Data Science System", Proceedings of the VLDB Endowment, vol. 11, No. 12 Copyright 2018 VLDB Endowment, 15 pages.

Jomaa et al., "Dataset2Vec: Learning Dataset Meta-Features", dated May 5, 2019, 23 pages.

Abe et al., "Developing an Integrated Time-Series Data Mining Environment for Medical Data Mining", Seventh IEEE International Conference on Data Mining—Workshops, dated 2007, 6 pages.

Ahmed et al., "An Empirical Comparison of Machine Learning Models for Time Series Forecasting", dated Sep. 15, 2010, 31 pages.

Amazon SageMaker, "DeepAR Forecasting Algorithm", https://docs.aws.amazon.com/sagemaker/latest/dg/deepar.html,last viewed on Jun. 29, 2020, 5 pages.

Artifical Intelligence Blog, "Announcing automated ML capability in Azure Machine Learning", dated Sep. 4, 2018, 8 pages.

Brownlee, Jason, "Time Series Forecasting as Supervised Learning", dated Aug. 21, 2019, 2 pages.

Camerra et al., "Beyond one billion time series: indexing and mining very large time series collections with iSAX2+", dated Feb. 16, 2013, 29 pages.

"Machine Learning Approaches for Time Series Data" dated May 19, 2019, 25 pages.

Wang et al., "Experimental comparison of representation methods and distance measures for time series data", dated Feb. 12, 2010, 35 pages.

Lin et al., "Experiencing SAX: a novel symbolic representation of time series", dated Apr. 3, 2007, 38 pages.

(56) References Cited

OTHER PUBLICATIONS

Ng, "Data preprocessing for machine learning: options and recommendations", dated Jun. 22, 2020, 12 pages.

Paoli et al., "Forecasting of preprocessed daily solar radiation time series using neural networks", Solar Energy, Elsevier, dated 2010, 43 pages.

Plotz et al., "Feature Learning for Activity Recognition in Ubiquitous Computing", dated Jan. 2011, 7 pages.

Schoenfeld et al., "Preprocessor Selection for Machine Learning Pipelines", dated 2018, 7 pages.

Song et al., "Deep r-th Root of Rank Supervised Joint Binary Embedding for Multivariate Time Series Retrieval", KDD 2018, dated Aug. 19-23, 2018, London, United Kingdom, 10 pages.

Faloutsos et al., "Fast Subsequence Matching in Time Series Databases", dated 1998, 11 pages.

Giraud-Carrier, "The Data Mining Advisor: Meta-learning at the Service of Practitioners", Fourth International Conference on Machine Learning and Applications (ICMLA'05), IEEE, 2005, 7 pages.

Kotthoff et al., "Auto-WEKA: Automatic Model Selection and Hyperparmeter Optimization in WEKA", Ch. 4, Automated Machine Learning Methods, Sys, Challenges, https://doi.org/10.1007/978-3-030-05318-5_4, pp. 81-95, May 18, 2019, 15pgs.

\* cited by examiner

FIG. 1B  COMPUTER 100

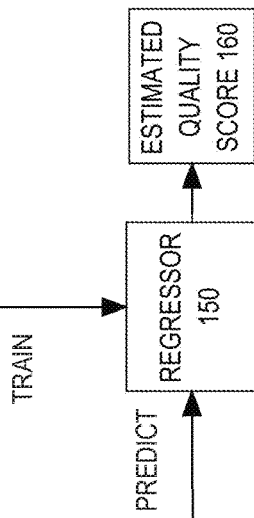

MACHINE LEARNING MODEL 130

LANDMARK CONFIGURATIONS 185

| LANDMARK | DATASET | HYPERPARAMETER X | HYPERPARAMETER Y | QUALITY SCORE |
|---|---|---|---|---|
| I | 111 | | | 0.8 |
| J | 111 | | | 0.9 |
| K | 112 | | | 0.6 |
| L | 112 | | | 0.7 |

PERFORMANCE TUPLES 140

| METAFEATURE A | METAFEATURE B | HYPERPARAMETER X | HYPERPARAMETER Y | QUALITY SCORE | LANDMARK SCORE I | LANDMARK SCORE J | LANDMARK SCORE K | LANDMARK SCORE L |
|---|---|---|---|---|---|---|---|---|
| | | | | 0.1 | 0.8 | 0.9 | 0.6 | 0.7 |
| | | | | 0.6 | 0.8 | 0.9 | 0.6 | 0.7 |
| | | | | 0.3 | 0.8 | 0.9 | 0.6 | 0.7 |
| | | | | 0.4 | 0.8 | 0.9 | 0.6 | 0.7 |

NEW DATASET 113

| METAFEATURE A | METAFEATURE B | HYPERPARAMETER U | HYPERPARAMETER V | LANDMARKS SCORES I-L |
|---|---|---|---|---|
| 2.1 | 3.2 | | | |
| 2.1 | 3.2 | 4.3 | 5.4 | |
| 2.1 | 3.2 | | | |
| 2.1 | 3.2 | | | |

TRAIN → REGRESSOR 150 → PREDICT → ESTIMATED QUALITY SCORE 160

USING METAMODELING FOR FAST AND ACCURATE HYPERPARAMETER OPTIMIZATION OF MACHINE LEARNING AND DEEP LEARNING MODELS

FIELD OF THE INVENTION

The present invention relates to hyperparameters optimization for machine learning (ML) models. Herein are techniques that train regressor(s) to predict how effective would a machine learning (ML) model be if configured with new values of hyperparameters and/or trained on a new dataset.

BACKGROUND

Use of machine learning (ML), such as deep learning (DL), is rapidly spreading through industries and business units and is becoming a ubiquitous tool within some corporations. A way to optimize an ML model entails tuning its hyperparameters, which are configuration settings. During hyperparameter tuning, an ML model is repeatedly trained with different (e.g. improving) hyperparameter values to explore a multidimensional configuration hyperspace. That exploration may be resource intensive of time and/or space. Hyperparameter settings have strong impact on model performance (e.g., accuracy, f1 score, etc.). Tuning a model's hyperparameters is exponentially hard and can be extremely time consuming especially for larger datasets.

Hyperparameter optimization of ML models is essential for many applications. This is because in most cases the default values of hyperparameters do not result in best performing models. During hyperparameter optimization, for an optimizer to explore the hyperparameter space, the ML model is trained and validated on a dataset many times using different hyperparameters values. Such exploration is time-consuming.

Unlike classical convex optimization problems, hyperparameter optimization of ML models is a unique and challenging problem due to at least the following three reasons:
Black-box optimization: Often there is no known analytical formula to express an ML model's performance as a function of its hyperparameters. That means one cannot rely on classical (e.g. convex) optimization methods to find the optimum value, and the only way to explore a configuration hyperspace is through a trial that entails training and evaluation using a set of hyperparameters values.
Training is slow: Training time of a single model is expensive and tuning requires re-training models and evaluating them several times per tuning session.
Large number of hyperparameters: This is especially the case in Deep Neural Network models that usually have large number of hyperparameters such as number of layers, number of neurons, dropout, L2 regularization, etc., in each layer, as well as activation and optimizer parameters.

BRIEF DESCRIPTION OF THE DRAWINGS

In the drawings.

FIG. 1B is a block diagram that depicts an example computer that uses hyperstars to quickly and concisely reveal some contours of a mysterious configuration hyperspace;

DETAILED DESCRIPTION

Figure 1A:
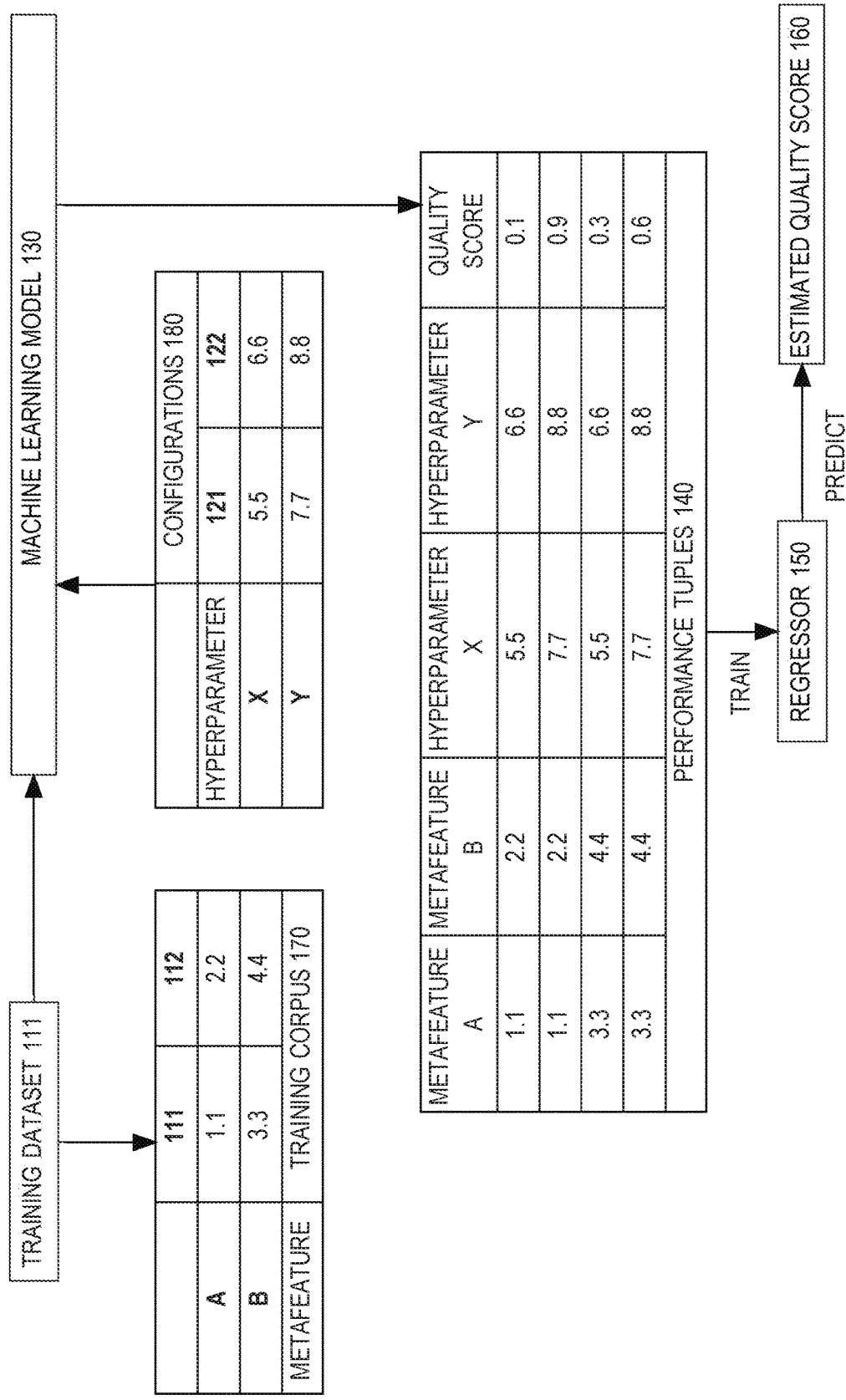
FIG. 1A is a block diagram that depicts an example computer that trains a regressor to predict how effective would a machine learning (ML) model be if configured with new values of hyperparameters and/or trained on a new dataset.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To prepare a metamodel (i.e. metalearning hyperparameters optimizer) for a cold start (i.e. untrained metamodel or unfamiliar dataset), several initial points are used to roughly survey a multidimensional hyperparameters space for configuring a machine learning (ML) model, before exploring regions with more promising sets of hyperparameters values. To obtain each point, the ML model needs to be trained/evaluated on datasets, which is usually time consuming. Large number of hyperparameters results in a high dimensionality of optimizer's search space, which in turn may intensify the cold-start problem: the optimizer needs more points to better cover the high dimensional search space.

The process of metalearning-based hyperparameters optimization consists of the following three stages:
1. Model training: generating a metadataset by repeatedly training a model with datasets;
2. Metamodel training: using the metadataset to train a metamodel;
3. Inference: hyperparameters optimization of the model by the metamodel for a new dataset.

All of those stages entail training the model. The second stage entails training a general metamodel. In an embodiment, the online third stage entails training an additional metamodel that is dedicated to the new dataset.

In the offline training stages 1-2, a metadataset needs to be collected across a corpus of datasets. To gather the metadata, an ML model is trained by varying hyperparameters across a range of values for each dataset and recording the obtained scores for each distinct pairing of a dataset and a hyperparameters configuration. That includes generating a set of configuration hyperstars (i.e. landmarks), which are performance reference points that may be reused across multiple datasets. Hyperstars may be used to quickly and concisely reveal some contours of a mysterious configuration hyperspace and/or dataset. Hyperstars are used herein to make quality score prediction flexible and more accurate for a metalearning regressor.

Dataset metafeatures are obtained for each dataset and combined with hyperstars, a current hyperparameters configuration, and a corresponding performance score. A regressor (i.e. metamodel) is tuned and trained on the metadataset to predict performance scores for the model. The trained regressor is used in the online third stage to bootstrap hyperparameter tuning. This is done by first extracting the metafeatures from the new metadataset and combining them with a set of (e.g. randomly generated) hyperparameters. The trained regressor can predict the scores for each generated hyperparameter configuration for a new dataset and train the model on those with highest predicted scores.

The online third stage entails inferencing by the general metamodel for hyperparameters optimization of the ML model given a new dataset. Metafeatures about the new dataset are used with the trained metamodel to warm start a hyperparameters optimization algorithm. The general metamodel predicts the performance score of the ML model for each of the randomly generated set of hyperparameter configurations. Specifically, static and dynamic metafeatures are obtained (e.g. extracted from) for the new dataset. Many hyperparameters configurations are generated and each one is combined with the metafeatures. A few top predicted hyperparameters configurations may be selected to evaluate the ML model with them. The runtime overhead of the prediction phase is usually insignificant compared to actual model evaluation (i.e. training and validation).

In an embodiment, for each training dataset, a computer derives, from the training dataset, values for dataset metafeatures. The computer performs, for each hyperparameters configuration, of a machine learning (ML) model, including landmark hyperparameters configurations: configuring the ML model based on the hyperparameters configuration, training the ML model based on the training dataset, and obtaining an empirical quality score that indicates how effective was said training the ML model when configured with the hyperparameters configuration. A performance tuple is generated that contains: the hyperparameters configuration, the values for the dataset metafeatures, the empirical quality score and, for each landmark configuration, the empirical quality score of the landmark configuration. Based on the performance tuples, a regressor is trained to predict an estimated quality score based on a given dataset and a given hyperparameters configuration.

The regressor is general, in the sense that it is trained with multiple datasets for eventual reuse with many new datasets. In an embodiment, an additional regressor is dedicated to learning and inferencing a new (i.e. unfamiliar) dataset and is not exposed to other datasets. In an embodiment, the general regressor may operate as "training wheels" for the dedicated regressor, such that the general regressor is used instead of or along with the dedicated regressor, at least until the dedicated regressor has had enough training to outperform the general regressor with the new dataset. In an embodiment, collaboration of both regressors entails confidence weighting them to reflect how well trained is the dedicated regressor so far, with training of the dedicated regressor still ongoing. In an embodiment, confidence weights are repeatedly adjusted in favor of the dedicated regressor to reflect monotonic improvements in the performance quality of the dedicated regressor in training.

1.0 Example Computer

FIGS. 1A-B are block diagrams that alternately depict a same example computer 100, in an embodiment. In FIG. 1A, computer 100 trains a regressor to predict how effective would a machine learning (ML) model be if configured with new values of hyperparameters and/or trained on a new dataset. Computer 100 may be one or more of a rack server such as a blade, a personal computer, a mainframe, a virtual computer, a smart phone, or other computing device.

Computer 100 may store within its memory two ML models 130 and 150. Depending on the embodiment, ML model 130 is designed for clustering, classification, regression, anomaly detection, prediction, or dimensionality reduction (i.e. simplification). Examples of ML algorithms include decision trees, support vector machines (SVM), Bayesian networks, stochastic algorithms such as genetic algorithms (GA), and connectionist topologies such as artificial neural networks (ANN). Implementations of ML may rely on matrices, symbolic models, and hierarchical and/or associative data structures. Parameterized (i.e. configurable) implementations of best of breed ML model types may be found in open source libraries such as scikit-learn (sklearn), Google's TensorFlow for Python and C++ or Georgia Institute of Technology's MLPack for C++. Shogun is an open source C++ ML library with adapters for several programing languages including C#, Ruby, Lua, Java, MatLab, R, and Python.

ML model 130 may have one of many model types. Each model type may have adjustable attributes (i.e. hyperparameters such as X-Y) that can be optimized to improve performance in various ways such as increased inference accuracy and/or reduced consumption of resource(s), such as time and/or space, during training and/or inferencing. Different model types have different amounts and different kinds of hyperparameters.

Before training, ML model 130 should be assigned a configuration, such as 121-122 of distinct configurations 180. Each configuration consists of a respective value for each of hyperparameters X-Y. For example, the value of hyperparameter X is 5.5 for configuration 121.

Each of hyperparameters X-Y has a range of multiple (e.g. infinitely many) values. Combinatorics of hyperparameters X-Y presents a hyperdimensional configuration space, with each of hyperparameters X-Y being one dimension of the configuration space.

The lifecycle of ML model 130 has two phases. The first phase is preparatory and entails training as shown, such as in a laboratory. The second phase entails inferencing (not shown) in a production environment, such as with live and/or streaming data.

During inferencing, ML model 130 is applied to a (e.g. unfamiliar) sample, which may be injected as input into ML model 130. That causes ML model 130 to process the sample according to the internal mechanics of ML model 130, which are specially configured according to reinforcement learning by ML model 130 during previous training. For example if ML model 130 is a classifier, then ML model 130 may select one of multiple mutually exclusive labels (i.e. classifications) for the sample, such as hot and cold.

During training, exploration of the configuration space may alter performance of ML model 130, which may achieve improvement(s) and/or degradation(s). For example, changing value(s) of hyperparameter(s) may simultaneously cause both training acceleration and decreased accuracy.

Supervised training of ML model 130 may entail processing training corpus 170 for reinforcement learning. Training corpus 170 contains at least training datasets 111-112 that may each contain files, records, or other data objects from which ML model 130 may form impressions that achieve generalizations.

Datasets 111-112 each have more or less distinct content. For example, dataset 111 may contain color photographs, and dataset 112 may contain monochrome photographs. In an embodiment, training corpus 170 is itself a monolithic dataset from which datasets 111-112 may be severed as non-overlapping cross-validation folds (i.e. portions) of the monolithic dataset. Freely available benchmark datasets for proofs of concept include OpenML's binary classification datasets.

No matter how similar or not are datasets 111-112, some generalization is possible, such that all datasets within training corpus 170 have their own (e.g. different) values for a same set of metafeatures that describe a dataset as a whole, more or less without regard for any particular item in the dataset. For example, one metafeature may count how many colors are in a palette needed to render all photos in a dataset, which may have a smaller integer value if the dataset is monochromatic.

For example, metafeature A may be an average luminosity of all photos in a dataset. For example, the value of metafeature A is 1.1 for dataset 111. Values of a metafeature may conform to a same datatype, such as integer, real number, or categorical, such as a photo orientation having a range of values such as portrait and landscape.

Derivation of metafeatures A-B from datasets such as 111-112 depends on the embodiment. Examples of metafeature derivation include a count of items (i.e. examples, samples) in the training dataset, a count of features of items in the training dataset, or a statistical moment (e.g. first, second, third, mean, or variance) of values of a feature in the training dataset. Other metafeatures may have more involved derivations, such as a mutual information between: a first feature in a training dataset, and a classification label or a second feature in the training dataset.

During training, ML model 130 is (e.g. concurrently) repeatedly reconfigured and retrained, each time with a distinct pairing of a training dataset of 111-112 and a configuration of 121-122. Because the training performance of ML model 130 depends on which configuration and which dataset, each training run achieves its own (e.g. different) performance measurement, shown as quality score. Quality score may be an accuracy, an error, a precision, a recall, a combination of those, or other metric that indicates how well trained is ML model 130.

With different scores for different datasets and for different hyperparameters values, performance tuples 140 may be generated based on training corpus 170 and configurations 180. When ignoring shown demonstrative header rows, for example, first data row of corpus 170 and first data row of configurations 180 are combined with the quality score that they achieved together, which forms first data row of performance tuples 140.

One way to detect a possible quality score for new hyperparameter values is to actually configure ML model 130 with those values and actually measure quality achieved from training ML model 130. However, training time for ML model 130 may be substantial and accompanied by central processing unit (CPU) consumption of electricity. As follows herein, that time and energy may be saved by instead having regressor 150 predict a quality score for ML model 130, without actually configuring and training ML model 130 based on the new hyperparameter values. For example when inferencing with a new dataset and/or a new hyperparameter configuration, regressor 150 may predict that ML model 130 would achieve estimated quality score 160.

Computer 100 metalearns because predictive regressor 150 learns by observing the performance of ML model 130. Performance tuples 140 may be used as a training dataset for regressor 150 to learn to predict quality scores for other datasets and/or other hyperparameter configurations. For example, each row of performance tuples 140 may be encoded as (e.g. part of) a feature vector to which regressor 150 may be applied during training.

In an embodiment, regressor 150 is, or is accompanied by, a random forest that learns correlations between quality scores, model hyperparameters, and/or dataset metafeatures. The random forest may naturally provide ML explainability (MLX) for the model and/or the dataset. For example, a random forest may reveal which hyperparameters and/or metafeatures are most or least significant for affecting quality scores.

In an embodiment, for a given dataset, computer 100 may, by exploring the configuration hyperspace of ML model 130, discover a promising hyperparameter configuration that potentially or actually achieves a best quality score. For example after regressor 150 is trained, a stochastic descent (not shown) or other multidimensional optimization may repeatedly invoke regressor 150 with (e.g. increasingly better) distinct hyperparameter configurations to eventually reach a best configuration. For example, an open source tool such as hyperopt may provide a harness that optimizes by repeatedly invoking regressor 150. In an embodiment, the hyperparameter configuration(s) of a best or best few (i.e. fixed amount) prediction(s) are used to actually train ML model 130 to validate the prediction and/or to select which configuration is empirically best.

Termination (i.e. convergence) criteria for such an exploration depends on the embodiment. For example, regressor 150 may be invoked a few times to quickly find a good configuration, or may be invoked many times to laboriously find a much better configuration. Any quality score predicted by regressor 150 and/or any hyperparameter configuration proposed by an optimizing exploration may or may not be subsequently empirically validated by actually training ML model 130.

The following example pseudocode may implement an example hyperparameter optimization.

---

Algorithm 1: Hyperparameter Optimization

---

Input: Dataset D, set of hyperparameters
H = {$H_1$, $H_2$, ... , $H_k$} corresponding to ML
model A, scoring function S(A(H), D), T rounds of
hyperparameter optimization
Output: Best hyperparameter configuration H*
For r in 1 to T do:
    Evaluate A($H^r$) on D
    M ← M + {$H^r$, S(A($H^r$), D)}
    Propose a new hyperparameter configuration $H^{r+1}$
Return H* = $\mathrm{argmax}_{H \in \{H^1,...,H^T\}}$ S(A(H), D)

---

2.0 Hyperstars

In FIG. 1B, same computer 100 uses hyperstars to quickly and concisely reveal some contours of a mysterious configuration hyperspace. In the various tabular data structures shown in FIG. 1B, cells shown as empty actually contain realistic values that are not shown.

While a training performance tuple having a quality score, dataset meta-features, and a hyperparameter configuration provides good information, the tuple insufficiently describe a natural spectrum of possible operational performance, such as quality scores possible with other hyperparameter configurations and/or other datasets for a same ML model. Herein, hyperstars are points within a configuration hyperspace that serve as landmarks, such as 185, and are introduced to make quality score prediction flexible and more accurate for a regressor such as 150.

Training of ML model 130 may initially use landmark configurations 185, which are a small subset of configurations 180 used during training. Landmark configurations 185 is shown as a table having some empty cells. Each empty cell actually contains a respective identifier of a training dataset or of hyperparameter X or Y of ML model 130, with each of landmarks I-L having a unique combination of such values.

Example heuristics for generating individual landmarks I-L of landmark configurations 185 are as follows. In an embodiment, landmark(s) are generated separately for each hyperparameter X-Y, with remaining hyperparameters held constant. In an embodiment, the remaining hyperparameters are set to their respective default values or the respective midpoints of their respective value ranges. In an embodiment, the hyperparameter not held constant is varied according to a heuristic.

For example, minimum, maximum, midpoint, default, and/or regular grid intervals may occur in a landmark for a hyperparameter not held constant. For example if hyperparameter X has an integer range of 4-10, and hyperparameter Y defaults to 5, then some landmark configurations, expressed as (hyperparameter X, hyperparameter Y), may be (4,5), (4+10/2=7,5), and (10,5). Other landmark configurations may instead vary Y. Default values may be handcrafted, such as by experimentation or vendor recommendation.

Generation of non-landmark configurations may use random values, default values, grid intervals, or values discovered by stateful activities such as with gradients, binary search, neighborhood, or other explorations (e.g. optimization). Here, stateful generation means that subsequent configurations may be (e.g. greedily or stochastically) based on previous configurations, such as by interpolation, extrapolation, or refinement such as by stochastic descent.

Initially, training actually uses landmark configurations 185 with ML model 130 and captures quality scores, shown as a rightmost column of landmark configurations 185. After landmark configurations 185 have quality scores, training of ML model 130 may continue with other hyperparameter configurations and/or datasets, and generation of performance tuples 140 may begin.

Performance tuples 140 may be generated as discussed above, with some additional data population. Each row (i.e. tuple) of performance tuples 140 stores the respective quality score of each landmark, shown as landmark scores I-L in performance tuples 140.

After training of regressor 150, regressor 150 may make predictions for a new dataset, such as 113, and/or new hyperparameter configurations. Input tuples for inferencing may include metafeatures of new dataset 113, hyperparameters of ML model 130, and landmarks scores as shown. For example while in a production environment, processing of new production dataset 113 may begin by actually training ML model 130 with new dataset 113 and landmark configurations I-L to generate the landmarks scores shown in the production input table.

In an embodiment, these configuration landmarks and/or their achieved quality scores are encoded as features into a feature vector with which regressor 150 may be trained or otherwise applied. Thus, a (e.g. very) low resolution sketch of a configuration hyperspace's performance landscape for a new dataset may be provided to regressor 150 to increase accuracy of the regressor's prediction.

Computer 100 may generate at least landmark configurations I-L that have distinct sets of values and are well (e.g. evenly and widely) spaced within the configuration hyperspace of at least hyperparameters X-Y. Landmark configurations X-Y should be representative samples that provide at least a glimpse of the landscape (i.e. gradients) within the configuration hyperspace. For example, some extrapolation and/or interpolation might be possible (i.e. somewhat valid) once the performance metrics of landmark configurations I-L are known. In an embodiment, a fixed amount of landmark configurations are generated. In an embodiment, the amount of landmark configurations depends on how many hyperparameters (i.e. dimensions) are involved. Techniques for generating landmark configurations are discussed later herein.

The following example pseudocode obtains a metadataset for training a predictive regressor.

---

Algorithm 2: Obtaining the metadataset MD and training $R_1$

Input: Corpus of datasets D = $\{D_1, D_2, ... , D_M\}$, the set of N hyperparameter
configurations H = $\{H^1, H^2, ... , H^N\}$, the set of landmark hyperparameters H* =
$\{H^1, H^2, ... , H^L\}$, the ML model A along with scoring function
Output: Trained metamodel $R_1$
MD ← ∅
Form the metadataset as follows:
For $D_i$ in D do:
    S ← Extract the static metafeatures of $D_i$
    L ← ∅
    For $H^j$ in H* do:
        L ← L + Score(A($H^j$), $D_i$)
    $f_i$ ← [S, L]
    For $H^j$ in H do:
        $f_i^j$ ← [$f_i$, $H^j$, Score(A($H^j$), $D_i$)]
    $F_i$ ← $\{f_i^1, {}^1f_i^2 ... , f_i^N\}$
    MD ← MD + $F_i$
Train and tune the metamodel $R_1$
$R_1$ ← Autotune(Random Forest, MD)
Return $R_1$

---

3.0 Example Regressor Training Process

Figure 2:
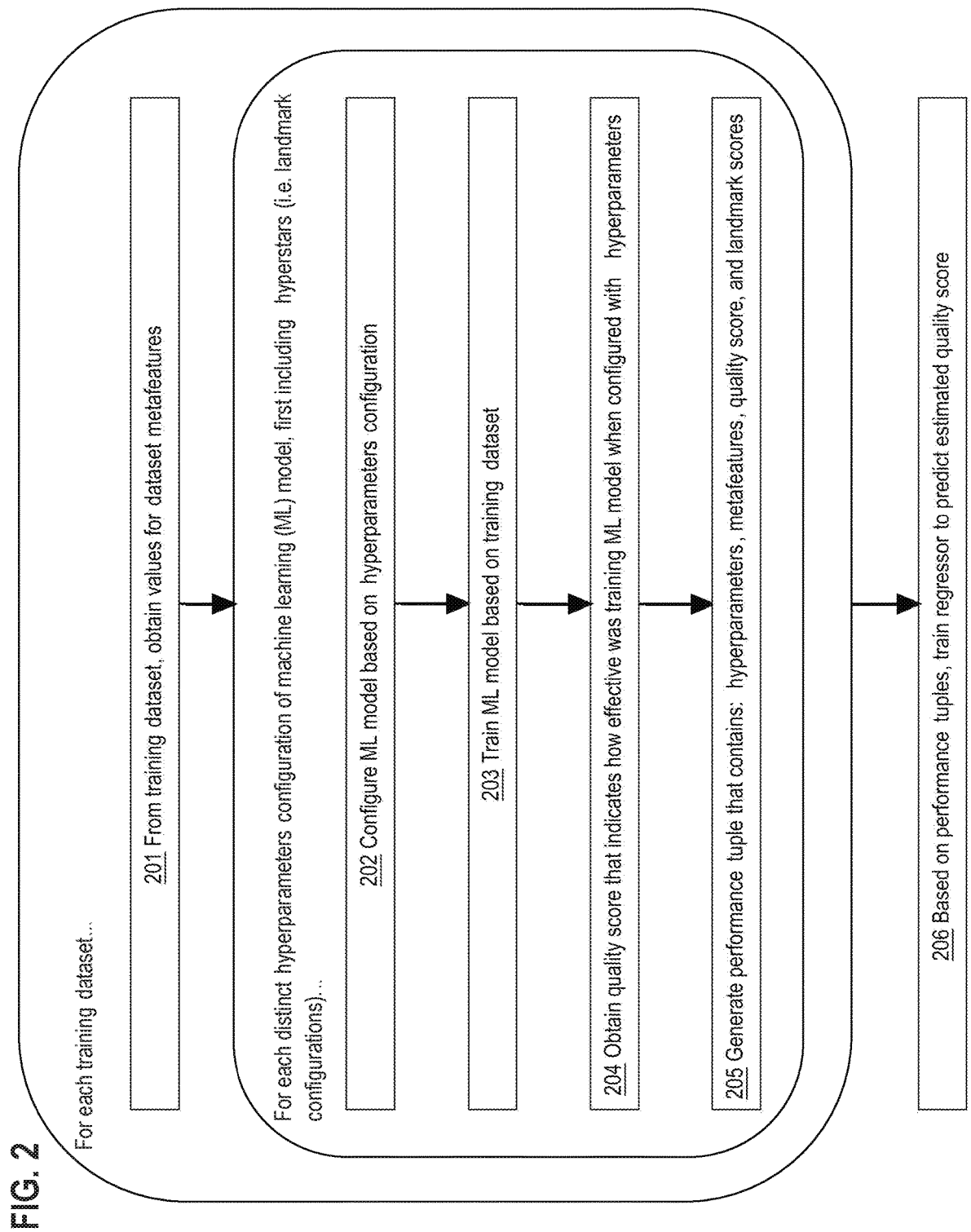
FIG. 2 is a flow diagram that depicts an example computer process for training a regressor to predict how effective would a machine learning (ML) model be if configured with given values of hyperparameters and trained on a given dataset.

FIG. 2 is a flow diagram that depicts computer 100 training a regressor to predict how effective would a machine learning (ML) model be if configured with given values of hyperparameters and trained on a given dataset, in an embodiment. FIG. 2 is discussed with reference to FIGS. 1A-B.

The process of FIG. 2 trains both of ML models 130 and 150. In steps 201-205, target ML model 130 is repeatedly trained with various hyperparameter configurations to collect target performance data. Step 206 trains predictive regressor 150 based on the performance data.

In an embodiment, step 206 may have pipeline parallelism with the other steps. For example, whenever the other steps generate an individual performance tuple or batch of tuples, that tuple or batch may be processed by step 206 with or without waiting for the other steps to generate all performance tuples.

Steps 201-205 are repeated for each training dataset in a training corpus. Step 201 is preparatory and obtains values of metafeatures of a current training dataset as discussed above for FIGS. 1A-B. In an embodiment, step 201 concurrently occurs for different training datasets.

Steps 202-205 are repeated for each of many distinct hyperparameters configurations of ML model 130. Actual training of ML model 130 occurs during steps 202-204 with a current dataset and a current hyperparameters configuration. Within hyperparameter configurations 180 are landmark configurations 185, which are the first to processed by steps 202-204.

Step 202 configures ML model 130 with the current hyperparameters configuration, and step 203 trains ML model 130 with the current dataset. Thus, step 204 is able to measure a respective quality score that captures how effective (e.g. accurate) is ML model 130 with the current hyperparameters and dataset. In an embodiment, steps 202-205 may be concurrently repeated for each hyperparameters configuration, such as by separate computers and/or processor cores.

Step 205 generates a performance tuple based on the quality score, current hyperparameters and dataset, and landmarks scores as discussed above. For example, performance tuples 140 are individually generated by respective individual occurrences of step 205.

After repeatedly retraining ML model 130 in steps 202-204, ML model 130 may be later retrained in still more training runs, such as when predictive regressor 150 is eventually used (e.g. by hyperopt) to further explore the configuration hyperspace of ML model 130 to find more, likely improving, hyperparameter configurations and hopefully a new best configuration.

Step 206 achieves metalearning by training regressor 150 to make performance predictions about ML model 130. As discussed herein, landmarks scores within performance tuples 140 accelerate training of and increase accuracy of regressor 150.

4.0 Dual Regressors

Figure 3:
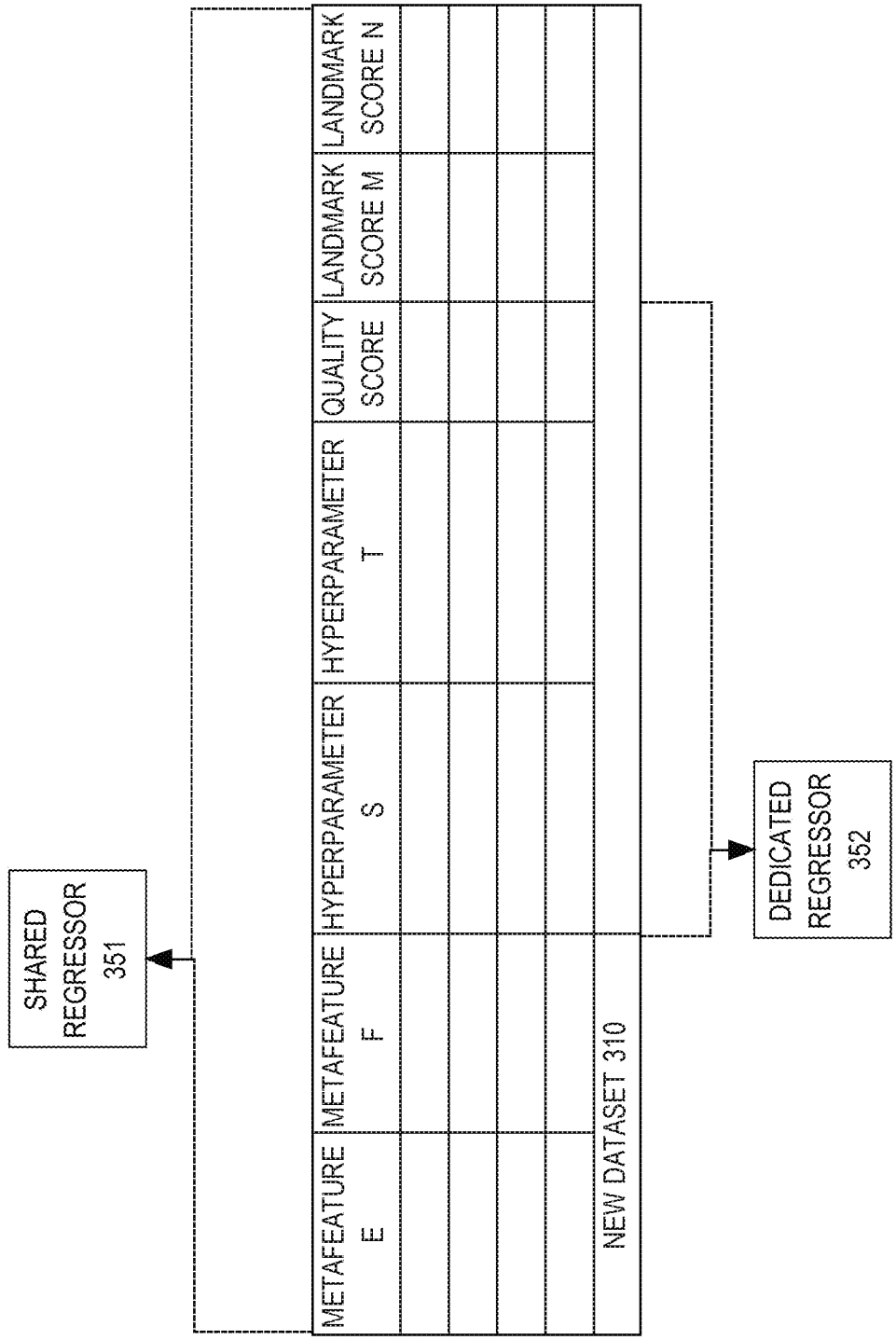
FIG. 3 is a block diagram that depicts an example computer that uses dual regressors to accommodate a (e.g. extraordinary) dataset.

FIG. 3 is a block diagram that depicts an example computer 300, in an embodiment. Computer 300 uses dual regressors to accommodate a (e.g. extraordinary) dataset. Computer 300 may be an implementation of computer 100. In the tabular data structure shown in FIG. 3, cells shown as empty actually contain realistic values that are not shown.

Shared regressor 351 is deployed in production inferencing mode and may be an implementation of regressors discussed earlier. Thus, shared regressor 351 is already trained on many datasets and is intended for reuse to make predictions of multiple new datasets, such as 310, with or without retraining.

Due to numerosity of items within the performance training corpus (not shown) of shared regressor 351, statistics may have central tendencies (e.g. mode) that cause reinforcement learning for shared regressor 351. After reinforcement training, shared regressor 351 is well prepared to recognize the performance landscape of a target ML model (not shown) that processed common examples, which may more or less fill an ordinary dataset that is processed by the target ML model. However, an uncommon dataset of the target ML model may (e.g. incidentally) have much abnormal data, which may reduce accuracies of the target ML model and of the shared regressor 351 as follows.

An uncommon target dataset may need uncommon (e.g. undiscovered) hyperparameters values for the target ML model. Hyperparameters values that previously performed well, may perform poorly with an unusual target dataset. Thus, shared regressor 351 may be trained to make predictions that are somewhat inaccurate for an unusual dataset, such as 310. Computer 300 has the following three strategies for accommodating a new (e.g. unusual dataset).

First, it may be better to have a dedicated regressor, such as 352, that is trained solely with new dataset 310 to make special predictions for dataset 310. For example after training solely with dataset 310, dedicated regressor 352 may be used (e.g. by hyperopt) to discover a better target hyperparameter configuration for dataset 310 than shared regressor 351 can.

Second and although dedicated regressor 352 is potentially (i.e. eventually) better than shared regressor 351, dedicated regressor 352 is initially untrained upon arrival of new dataset 310. Whereas, shared regressor 351 is already fully trained. Thus at least initially, it may be better to use shared regressor 351 to make predictions about new dataset 310.

In an embodiment, the predictions by regressors 351-352 are confidence weighted. Shared regressor 351 may initially have moderate or somewhat high confidence. Whereas untrained dedicated regressor 352 may initially have low or no confidence.

As training of dedicated regressor 352 proceeds, confidence in dedicated regressor 352 monotonically increases, such as by schedule, such as according to time, iterations, performance tuples trained with so far, error, and/or other convergence criteria. In an embodiment, whichever regressor 351-352 currently has more weight has more impact in choosing hyperparameter configuration values. In a multi-dimensionally optimizing (e.g. hyperopt) embodiment, each of regressors 351-352 ranks the proposed hyperparameter configuration as ranks R1 and R2 (not shown), respectively. Then the rankings are rescaled according to the weight W1 for regressor 351, and W2 for regressor 352. The final rank of the hyperparameter configuration is R, which is R1*W1+R2*W2. After rescaling the rankings for all other hyperparameter configurations, top configurations that have the highest ranking as selected. In an embodiment, when the confidence of dedicated regressor 352 exceeds a threshold or exceeds that of shared regressor 351 by some threshold amount, then regressor 351 is no longer used to make predictions for new dataset 310.

A third way that computer 300 accommodates new dataset 310 involves landmark scores M-N. Even though shared regressor 351 has no training experience with new dataset 310, landmark scores M-N more or less immediately provide a crude overview of the performance landscape of new dataset 310. Thus, landmark scores M-N increase the accuracy of regressors 351-352 and accelerate the training of dedicated regressor 352.

In the shown embodiment, both regressors 351-352 reuse same landmark configurations to achieve different landmark scores. In an embodiment not shown, landmark configurations for training regressor 352 may include a fixed amount of best (e.g. non-landmark) configurations that were used for regressor 351.

A consequence of dedicated regressor 352 to new dataset 310/ is that values of metafeatures E-F are constant throughout the life (i.e. training and inferencing) of dedicated regressor 352, which means that metafeatures E-F have no effect upon the operation of dedicated regressor 352. Thus, all metafeatures E-F are irrelevant to dedicated regressor 352 and need not ever be provided to dedicated regressor 352.

In the shown embodiment, dashed arrows pointing into regressors 351-352 indicate which subset of performance features (i.e. columns) are provided to which regressor. As shown, shared regressor 351 expects all columns. As shown, metafeatures E-F are not provided to dedicated regressor 352.

In the shown embodiment, landmark scores M-N are not provided to dedicated regressor 352. Instead and although not shown, landmark scores may be transposed for dedicated regressor 352 such that landmarks are provided to dedicated regressor 352 as individual performance tuples with a respective landmark score stored in the quality score column.

In those ways and as shown, dedicated regressor 352 may be applied to performance feature vectors that are narrower (i.e. less bytes) than the performance feature vectors of shared regressor 352.

The following example pseudocode achieves metalearning by a dedicated regressor $R_2$ that is accompanied by a general regressor $R_1$ that is already trained.

---

Algorithm 3: Hyperparameter Optimization with Metalearning

---

Input: Trained and tuned metamodel $R_1$, new dataset D, set of hyperparameters H =
$\{H_1, H_2, ... , H_k\}$ corresponding to ML model A,
scoring function Score(A(H), D),
Maximum number of iterations T, N number of
random samples, and n number of trials at each round
Output: Best Hyperparameter configuration H*
$S_{new}$ ← Extract the metafeatures of $D_{new}$
$L_{new}$ ← Extract the landmark_features corresponding to $D_{new}$ and A
$f_{new}$ ← $[S_{new}, L_{new}]$
For r in 1 to T do:
    $F_{1:n}$ ← Generate n random hyperparameter configurations
$H^1, H^2, ... , H^n$ and prepend each with $f_{new}$
    $S_{1:n}^1$ ← Predicted_Score($R_1(F_{1:n})$)
If $R_2$ is trained:
    $S_{1:n}^2$ ← Predicted_Score($R_2(F_{1:n})$)
Else:
    $S_{1:n}^2$ ← 0
$W_1$ ← (T - r)/T
$W_2$ ← 1 - $W_1$
Sort $S_{1:n}$ = + $W_1 S_{1:n}^1 W_2 S_{1:n}^2$ and pick top
    n performing instances $F_{1:n}$ and their
corresponding hyperparameters
    Evaluate $A(H^i)$ on D for each $H^i \in \{H^1, H^2, ... , H^n\}$
    M ← M + $\{H^i, Score(A(H^i), D)\}$ for i $\in \{1, 2, ... , n\}$
    Append $f_{new}$ to each instance of M and form $F_{1:n}^2$

---

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
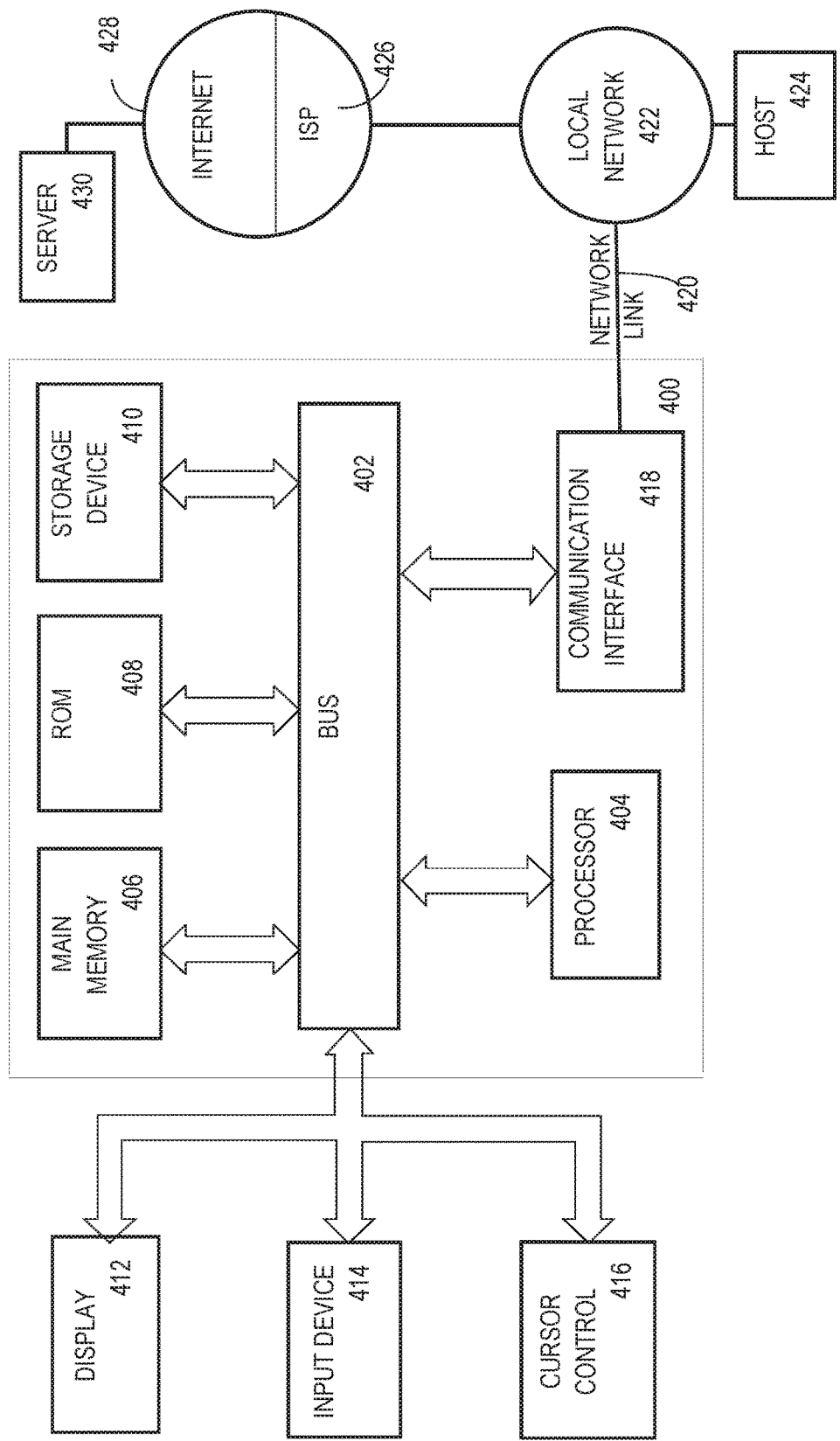
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
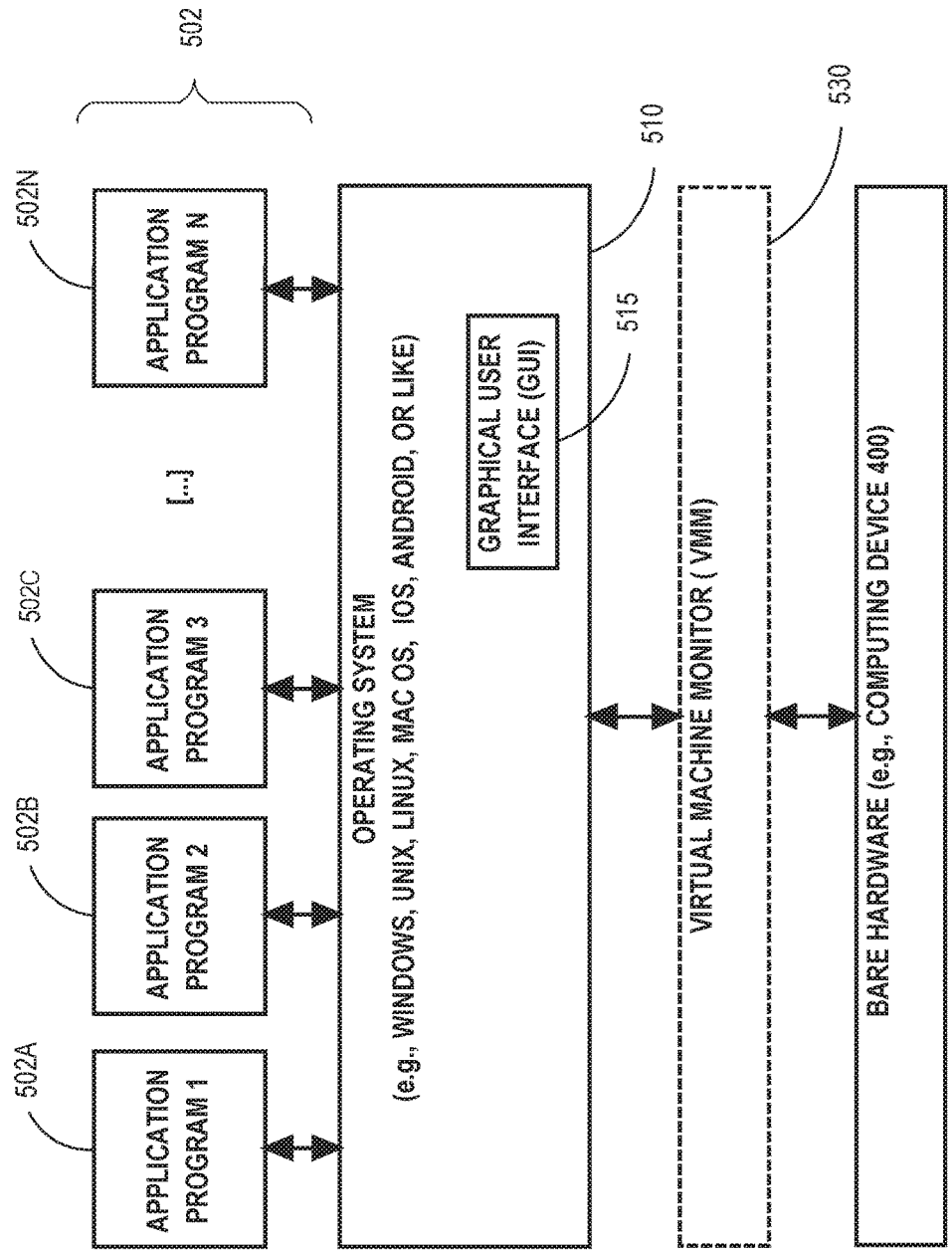
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feed-forward neural network. Other types of neural networks share characteristics of neural networks described below.

In a layered feed forward network, such as a multilayer perceptron (MLP), each layer comprises a group of neurons.

A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A method comprising:
for each training dataset of a plurality of training datasets:
  a) deriving, from the training dataset, a plurality of values for a plurality of dataset metafeatures;
  b) generating for a machine learning (ML) model that has a plurality of hyperparameters:
    i) a plurality of landmark hyperparameter configurations that comprises a first landmark hyperparameter configuration and a second landmark hyperparameter configuration, and
    ii) a plurality of distinct hyperparameter configurations that includes the plurality of landmark hyperparameter configurations, wherein each hyperparameter configuration of the plurality of distinct hyperparameter configurations contains a value for each hyperparameter of the plurality of hyperparameters; and
  c) for each hyperparameter configuration of the plurality of distinct hyperparameter configurations:
    i) configuring the ML model with the hyperparameter configuration;
    ii) training, based on the training dataset, the ML model when configured with the hyperparameter configuration;

iii) obtaining an empirical quality score that indicates how effective was said training the ML model when configured with the hyperparameter configuration; and iv) generating a performance tuple of a plurality of performance tuples, wherein the performance tuple contains: the hyperparameter configuration, the plurality of values for the plurality of dataset metafeatures, and the empirical quality score;

encoding each performance tuple of the plurality of performance tuples into a respective feature vector that contains:

the empirical quality score of the first landmark hyperparameter configuration, and the empirical quality score of the second landmark hyperparameter configuration;

training, based on said feature vectors of the plurality of performance tuples, a regressor to predict an estimated quality score based on a given dataset and a given hyperparameter configuration;

deriving, from a new dataset, a new plurality of values for said plurality of dataset metafeatures;

for each hyperparameter configuration of a second plurality of distinct hyperparameter configurations, predicting, by the regressor, a new estimated quality score of a first plurality of estimated quality scores, wherein the new estimated quality score is based on: the hyperparameter configuration, and the new plurality of values for the plurality of dataset metafeatures;

selecting a particular hyperparameter configuration of the second plurality of distinct hyperparameter configurations that has a highest estimated quality score of the first plurality of estimated quality scores; and training the ML model based on the particular hyperparameter configuration and the new dataset;

wherein the method is performed by one or more computers.

2. The method of claim 1, wherein the second plurality of distinct hyperparameter configurations comprises the plurality of landmark hyperparameter configurations.

3. The method of claim 1 wherein:

the selecting the particular hyperparameter configuration comprises selecting a fixed amount of hyperparameter configurations that have the highest estimated quality scores of the first plurality of estimated quality scores;

the fixed amount of hyperparameter configurations is more than one; and the training the ML model based on the particular hyperparameter configuration comprises, for each hyperparameter configuration of the fixed amount of hyperparameter configurations, training the ML model based on the hyperparameter configuration.

4. The method of claim 3 further comprising, for each hyperparameter configuration of the second plurality of distinct hyperparameter configurations:

training, based on the fixed amount of hyperparameter configurations, a second regressor to predict a second estimated quality score, and predicting, by the second regressor, the second estimated quality score of a second plurality of estimated quality scores.

5. The method of claim 4 further comprising calculating a weighted average of the highest estimated quality score of the first plurality of estimated quality scores and the second estimated quality score of the second plurality of estimated quality scores with an adjustable weight that monotonically increases in favor of the second estimated quality score of the second plurality of estimated quality scores.

6. The method of claim 1, wherein at least one configuration of the plurality of distinct hyperparameter configurations comprises at least one selected from a group comprising: a respective randomly generated value for each of one or more hyperparameters, and a default value.

7. The method of claim 1, wherein at least one configuration of the plurality of distinct hyperparameter configurations is generated during a stochastic descent.

8. The method of claim 1, wherein the plurality of dataset metafeatures comprises, for a training dataset in the plurality of training datasets, at least one selected from a group consisting of:

a count of features of examples in the training dataset, a second or third statistical moment of values of a feature in the training dataset, a mutual information between a first feature in the training dataset and a label, and a mutual information between a first feature in the training dataset and a second feature in the training dataset.

9. One or more non-transitory computer-readable media storing instructions that, when executed by one or more processors, cause the one or more processors to perform:

for each training dataset of a plurality of training datasets:

a) deriving, from the training dataset, a plurality of values for a plurality of dataset metafeatures;

b) generating for a machine learning (ML) model that has a plurality of hyperparameters:

i) a plurality of landmark hyperparameter configurations that comprises a first landmark hyperparameter configuration and a second landmark hyperparameter configuration, and ii) a plurality of distinct hyperparameter configurations that includes the plurality of landmark hyperparameter configurations, wherein each hyperparameter configuration of the plurality of distinct hyperparameter configurations contains a value for each hyperparameter of the plurality of hyperparameters; and c) for each hyperparameter configuration of the plurality of distinct hyperparameter configurations:

i) configuring the ML model with the hyperparameter configuration;

ii) training, based on the training dataset, the ML model when configured with the hyperparameter configuration;

iii) obtaining an empirical quality score that indicates how effective was said training the ML model when configured with the hyperparameter configuration; and iv) generating a performance tuple of a plurality of performance tuples, wherein the performance tuple contains: the hyperparameter configuration, the plurality of values for the plurality of dataset metafeatures, and the empirical quality score;

encoding each performance tuple of the plurality of performance tuples into a respective feature vector that contains:

the empirical quality score of the first landmark hyperparameter configuration, and the empirical quality score of the second landmark hyperparameter configuration;

training, based on said feature vectors of the plurality of performance tuples, a regressor to predict an estimated quality score based on a given dataset and a given hyperparameter configuration;

deriving, from a new dataset, a new plurality of values for said plurality of dataset metafeatures;

for each hyperparameter configuration of a second plurality of distinct hyperparameter configurations, predicting, by the regressor, a new estimated quality score of a first plurality of estimated quality scores, wherein the new estimated quality score is based on: the hyperparameter configuration, and the new plurality of values for the plurality of dataset metafeatures;

selecting a particular hyperparameter configuration of the second plurality of distinct hyperparameter configurations that has a highest estimated quality score of the first plurality of estimated quality scores; and training the ML model based on the particular hyperparameter configuration and the new dataset.

10. The one or more non-transitory computer-readable media of claim 9, wherein the second plurality of distinct hyperparameter configurations comprises the plurality of landmark hyperparameter configurations.

11. The one or more non-transitory computer-readable media of claim 9, wherein:

the selecting the particular hyperparameter configuration comprises selecting a fixed amount of hyperparameter configurations that have the highest estimated quality scores of the first plurality of estimated quality scores;

the fixed amount of hyperparameter configurations is more than one; and the training the ML model based on the particular hyperparameter configuration comprises, for each hyperparameter configuration of the fixed amount of hyperparameter configurations, training the ML model based on the hyperparameter configuration.

12. The one or more non-transitory computer-readable media of claim 11, wherein the instructions further cause, for each hyperparameter configuration of the second plurality of distinct hyperparameter configurations:

training, based on the fixed amount of hyperparameter configurations, a second regressor to predict a second estimated quality score, and predicting, by the second regressor, the second estimated quality score of a second plurality of estimated quality scores.

13. The one or more non-transitory computer-readable media of claim 12 further comprising calculating a weighted average of the highest estimated quality score of the first plurality of estimated quality scores and the second estimated quality score of the second plurality of estimated quality scores with an adjustable weight that monotonically increases in favor of the second estimated quality score of the second plurality of estimated quality scores.

14. The one or more non-transitory computer-readable media of claim 9, wherein at least one configuration of the plurality of distinct hyperparameter configurations comprises at least one selected from a group comprising: a respective randomly generated value for each of one or more hyperparameters, and a default value.

15. The one or more non-transitory computer-readable media of claim 9, wherein at least one configuration of the plurality of distinct hyperparameter configurations is generated during a stochastic descent.

16. The one or more non-transitory computer-readable media of claim 9, wherein the plurality of dataset metafeatures comprises, for a training dataset in the plurality of training datasets, at least one selected from a group consisting of:

a count of features of examples in the training dataset, a second or third statistical moment of values of a feature in the training dataset, a mutual information between a first feature in the training dataset and a label, and a mutual information between a first feature in the training dataset and a second feature in the training dataset.

17. One or more computers comprising one or more hardware processors configured to:

for each training dataset of a plurality of training datasets:

a) derive, from the training dataset, a plurality of values for a plurality of dataset metafeatures;

b) generate for a machine learning (ML) model that has a plurality of hyperparameters:

i) a plurality of landmark hyperparameter configurations that comprises a first landmark hyperparameter configuration and a second landmark hyperparameter configuration, and ii) a plurality of distinct hyperparameter configurations that includes the plurality of landmark hyperparameter configurations, wherein each hyperparameter configuration of the plurality of distinct hyperparameter configurations contains a value for each hyperparameter of the plurality of hyperparameters; and c) for each hyperparameter configuration of the plurality of distinct hyperparameter configurations:

i) configure the ML model with the hyperparameter configuration;

ii) train, based on the training dataset, the ML model when configured with the hyperparameter configuration;

iii) obtain an empirical quality score that indicates how effective was said training the ML model when configured with the hyperparameter configuration; and iv) generate a performance tuple of a plurality of performance tuples, wherein the performance tuple contains: the hyperparameter configuration, the plurality of values for the plurality of dataset metafeatures, and the empirical quality score;

encode each performance tuple of the plurality of performance tuples into a respective feature vector that contains:

the empirical quality score of the first landmark hyperparameter configuration, and the empirical quality score of the second landmark hyperparameter configuration;

train, based on said feature vectors of the plurality of performance tuples, a regressor to predict an estimated quality score based on a given dataset and a given hyperparameter configuration;

derive, from a new dataset, a new plurality of values for said plurality of dataset metafeatures;

for each hyperparameter configuration of a second plurality of distinct hyperparameter configurations, predict, by the regressor, a new estimated quality score of a plurality of estimated quality scores, wherein the new estimated quality score is based on: the hyperparameter configuration, and the new plurality of values for the plurality of dataset metafeatures;

select a particular hyperparameter configuration of the second plurality of distinct hyperparameter configurations that has a highest estimated quality score of the plurality of estimated quality scores; and
train the ML model based on the particular hyperparameter configuration and the new dataset.

* * * * *

UNITED STATES PATENT AND TRADEMARK OFFICE
CERTIFICATE OF CORRECTION

PATENT NO. : 11,868,854 B2
APPLICATION NO. : 16/426530
DATED : January 9, 2024
INVENTOR(S) : Moharrer et al.

It is certified that error appears in the above-identified patent and that said Letters Patent is hereby corrected as shown below:

On the Title Page

On page 2, Column 1, item (56) under Other Publications, Line 21, delete "Applicationsm AISMSA" and insert -- Applications AIMSA --, therefor.

On page 2, Column 2, item (56) under Other Publications, Line 1, delete "fro" and insert -- for --, therefor.

On page 2, Column 2, item (56) under Other Publications, Line 63, delete "CBRApproach"," and insert -- CBR Approach", --, therefor.

On page 3, Column 1, item (56) under Other Publications, Line 33, delete ""E cient" and insert -- "Efficient --, therefor.

On page 3, Column 1, item (56) under Other Publications, Line 35, delete "Artifical" and insert -- Artificial --, therefor.

On page 3, Column 1, item (56) under Other Publications, Line 48, delete "30 th" and insert -- 30th --, therefor.

On page 3, Column 2, item (56) under Other Publications, Line 25, delete "Faith" and insert -- Fatih --, therefor.

On page 3, Column 2, item (56) under Other Publications, Line 25, delete "for" and insert -- of --, therefor.

On page 3, Column 2, item (56) under Other Publications, Line 59, delete "Artifical" and insert -- Artificial --, therefor.

Signed and Sealed this
Fourteenth Day of May, 2024

Katherine Kelly Vidal
*Director of the United States Patent and Trademark Office*

CERTIFICATE OF CORRECTION (continued)
U.S. Pat. No. 11,868,854 B2

On page 4, Column 1, item (56) under Other Publications, Line 19, delete "Hyperparmeter" and insert -- Hyperparameter --, therefor.

In the Specification

In Column 10, Line 55, delete "310l" and insert -- 310 --, therefor.

In Column 11, Line 34, delete "$+ W_1 S_{1:n}^1 W_2 S_{1:n}^2$" and insert -- $W_1 S_{1:n}^1 + W_2 S_{1:n}^2$ --, therefor.

In Column 18, Line 38, delete "and or" and insert -- and/or --, therefor.

In the Claims

In Column 24, Line 15, in Claim 17, delete "fora" and insert -- for a --, therefor.